US012523193B2

(12) United States Patent
Merkov et al.

(10) Patent No.: US 12,523,193 B2
(45) Date of Patent: Jan. 13, 2026

(54) METHOD OF ASSEMBLING A SPILL VALVE OF A FUEL PUMP

(71) Applicant: PHINIA Jersey Holdings LLC, Wilmington, DE (US)

(72) Inventors: Robert Merkov, Webster, NY (US); Youssef Kazour, Pittsford, NY (US); Joseph G. Spakowski, Rochester, NY (US)

(73) Assignee: PHINIA Jersey Holdings LLC, Wilmington, DE (US)

( * ) Notice: Subject to any disclaimer, the term of this patent is extended or adjusted under 35 U.S.C. 154(b) by 0 days.

(21) Appl. No.: 18/743,423

(22) Filed: Jun. 14, 2024

(65) Prior Publication Data

US 2025/0382936 A1 Dec. 18, 2025

(51) Int. Cl.
*F02M 59/00* (2006.01)
*B23K 9/00* (2006.01)
*F02M 59/46* (2006.01)
*F02M 59/48* (2006.01)

(52) U.S. Cl.
CPC ............... *F02M 59/46* (2013.01); *B23K 9/00* (2013.01); *F02M 59/48* (2013.01)

(58) Field of Classification Search
CPC ............................... F02M 59/46; F02M 59/48
See application file for complete search history.

(56) References Cited

U.S. PATENT DOCUMENTS 9,828,958 B2 * 11/2017 Saito ...................... F02M 55/04
10,247,181 B2 * 4/2019 Usui .................... F02M 63/005
2001/0035464 A1 * 11/2001 Harcombe ........... F02M 59/466 239/96
2009/0110575 A1 * 4/2009 Munakata ............. F04B 53/168 417/437
2019/0128229 A1 * 5/2019 Hashida ................. F02M 59/44
2019/0301414 A1 * 10/2019 Usui .................... F02M 63/005
2019/0323465 A1 * 10/2019 Saito ....................... F02M 59/36
2020/0080526 A1 * 3/2020 Kawano ............... F02M 59/368
2020/0284230 A1 9/2020 Takamizawa
2022/0381213 A1 * 12/2022 Yagai ................. F02M 63/0036
(Continued)

FOREIGN PATENT DOCUMENTS

CN 107110097 A * 8/2017 ............. F02M 59/44
DE 102012201035 A1 8/2012
DE 112011105898 T5 * 8/2014 ............ F04B 1/0404
(Continued)

*Primary Examiner* — Kiley S Stoner

(74) *Attorney, Agent, or Firm* — WARNER NORCROSS + JUDD LLP

(57) ABSTRACT

A method of assembling a spill valve of a high-pressure fluid pump includes disposing an inlet valve sleeve on an assembly tool such that the inlet valve sleeve contacts a fixture surface of the assembly tool. A pole piece is disposed within a cavity of a spill valve body. An open end of a spill valve body with the pole piece therein is inserted into the inlet valve sleeve that is on the assembly tool. The spill valve body is welded to the inlet valve sleeve to form a body sub-assembly. Subsequent to welding the spill valve body to the inlet valve sleeve, the body sub-assembly is removed from the assembly tool and inserted into a bore in an outer surface of a fuel pump housing. The inlet valve sleeve of the body sub-assembly is then welded to the fuel pump housing adjacent the bore.

15 Claims, 7 Drawing Sheets

(56) References Cited

U.S. PATENT DOCUMENTS

| | | | | |
|---|---|---|---|---|
| 2024/0003322 A1* | 1/2024 | Usui | .................... | F02M 59/102 |

FOREIGN PATENT DOCUMENTS

| | | | | | |
|---|---|---|---|---|---|
| DE | 102018200612 A1 * | 7/2019 | ........... | F02M 59/445 |
| DE | 112018003099 T5 * | 3/2020 | ........... | F02M 59/485 |
| DE | 112018005561 T5 * | 7/2020 | ........... | F02M 59/445 |
| DE | 112018005595 T5 * | 7/2020 | ........... | F02M 59/025 |
| EP | 0628372 A1 * | 12/1994 | ........... | B23K 11/315 |
| GB | 2591519 A | 8/2021 | | |
| WO | WO-2017212737 A1 * | 12/2017 | ......... | F02M 63/0022 |

* cited by examiner

METHOD OF ASSEMBLING A SPILL VALVE OF A FUEL PUMP

FIELD OF THE INVENTION

The disclosure generally relates to a fuel pump which supplies fuel to an internal combustion engine, and more particularly to a method of assembling a spill valve of the fuel pump.

BACKGROUND OF THE INVENTION

Fuel systems in modern internal combustion engines fueled by gasoline, particularly for use in the automotive market, employ gasoline direct injection (GDi) where fuel injectors are provided which inject fuel directly into combustion chambers of the internal combustion engine. In such systems employing GDi, fuel from a fuel tank is supplied under relatively low pressure by a low-pressure fuel pump which is typically an electric fuel pump located within the fuel tank. The low-pressure fuel pump supplies the fuel to a high-pressure fuel pump which typically includes a fuel pump housing and a pumping plunger which is reciprocated, by a camshaft of the internal combustion engine, within the fuel pump housing. Reciprocation of the pumping plunger further pressurizes the fuel in order to be supplied to fuel injectors which inject the fuel directly into the combustion chambers of the internal combustion engine. During operation, the internal combustion engine is subject to varying demands for output torque. In order to accommodate the varying output torque demands, the mass of fuel delivered by each stroke of the pumping plunger must also be varied. One strategy to vary the delivery of fuel by the high-pressure fuel pump is to use an inlet valve assembly which includes a solenoid. The inlet valve assembly (also referred to as a spill valve or alternatively a control valve) may allow a full charge of fuel to enter the pumping chamber during each intake stroke, however, the solenoid may be operated to cause the inlet valve assembly to remain open during a portion of a compression stroke of the pumping plunger to allow some fuel to spill back toward the source. When the solenoid is then operated to allow the inlet valve assembly to close, the remainder of the compression stroke pressurizes the fuel and discharges the fuel to the fuel injectors.

A conventional method of assembling a spill valve includes inserting an inlet valve disc sub-assembly into a bore in the fuel pump housing that is in fluid communication with a pumping chamber within the fuel pump housing, and subsequently press fitting an inlet valve sleeve into the bore. Once the inlet valve sleeve is flush with the peripheral edge of the bore at an outer surface of the fuel pump housing, the inlet valve sleeve is welded to the fuel pump housing. Next, a needle sub-assembly including a spill valve rod, a washer, and an armature are inserted into the inlet valve disc sub-assembly by pushing the spill valve rod into a central hole in the inlet valve disc of the sub-assembly. Subsequently, a spring is added to the needle sub-assembly, and a spill valve body in the form of a can, having a pole piece disposed therein, is pushed into the inlet valve sleeve so that the spill valve body encloses the needle sub-assembly and the spill valve rod of the sub-assembly is pushed as far into the inlet valve disc as possible. Next, the stroke of the needle sub-assembly is set by a robot having gripper arms that grip the spill valve body and pull the spill valve body out of the inlet valve sleeve a defined small distance set by a micrometer. At this time, the robot releases its grip from the spill valve body, and the spill valve body is welded to the inlet valve sleeve to secure the spill valve body to the inlet valve sleeve. However, the welding step may undesirably generate blowoff and/or spatters that penetrate into the spill valve body and may later interfere with the performance of the spill valve. Also, if the grip of the robot arm slips during the pulling step prior to welding, the stroke of the needle subassembly may not be set at the proper distance because the spill valve body will not be moved the set, desired distance. This may also affect the performance of the spill valve.

Therefore, a need exists for a method of assembling the spill valve that minimizes or eliminates one or more of the shortcomings set forth above.

BRIEF SUMMARY

An improved method of assembling a spill valve of a high-pressure fluid pump is provided. In some embodiments, the method includes providing an inlet valve sleeve, and an assembly tool having a fixture surface and a stepped portion adjacent the fixture surface. The method further includes disposing the inlet valve sleeve on the assembly tool such that the inlet valve sleeve contacts the fixture surface of the assembly tool. The method further includes providing a spill valve body having a wall defining a cavity therein and an open end, wherein a pole piece is disposed within the cavity. The method further includes inserting the open end of the spill valve body with the pole piece therein into the inlet valve sleeve. The method further includes welding the spill valve body to the inlet valve sleeve to form a body sub-assembly. The method further includes providing a fuel pump housing having a bore formed in an outer surface of the fuel pump housing. Subsequent to welding the spill valve body to the inlet valve sleeve, the method further includes removing the body sub-assembly from the assembly tool and inserting the body sub-assembly into the bore in the fuel pump housing. The method then includes welding the inlet valve sleeve of the body sub-assembly to the fuel pump housing adjacent the bore.

In specific embodiments, prior to the step of inserting the spill valve body into the inlet valve sleeve, the method further includes providing a needle sub-assembly including a spill valve rod, a washer, and an armature, wherein the washer is generally sandwiched between the spill valve rod and the armature such that the spill valve rod extends away from a side of the washer opposite the armature. The method also further includes inserting the spill valve rod of the needle sub-assembly through the inlet valve sleeve such that an increased diameter portion of the spill valve rod contacts the stepped portion of the assembly tool.

In particular embodiments, a spring member is placed through a bore in the armature of the needle sub-assembly and in urged engagement with the washer of the needle sub-assembly and the pole piece.

In particular embodiments, a height of the stepped portion of the assembly tool relative to the assembly surface defines a stroke length of the needle sub-assembly.

In specific embodiments, a pulling force is exerted on the spill valve body in a direction away from the inlet valve sleeve during the step of welding the spill valve body to the inlet valve sleeve.

In specific embodiments, the stepped portion of the assembly tool includes an elongated protrusion.

In particular embodiments, the step of inserting the open end of the spill valve body with the pole piece therein into the inlet valve sleeve further includes contacting the pole piece with the elongated protrusion of the assembly tool.

In particular embodiments, the inlet valve sleeve contacts a sidewall of the stepped portion of the assembly tool.

In particular embodiments, the pole piece is integral with the spill valve body.

In certain embodiments, after removing the body sub-assembly from the assembly tool and prior to inserting the body sub-assembly into the bore in the fuel pump housing, the method further includes providing a needle sub-assembly including a spill valve rod, a washer, and an armature, wherein the washer is generally sandwiched between the spill valve rod and the armature such that the spill valve rod extends away from a side of the washer opposite the armature. The method also further includes inserting a spring member through a bore in the armature, and inserting the spring member and needle sub-assembly into the cavity of the spill valve body and adjacent pole piece such that the spring member is disposed between the washer and the pole piece.

In specific embodiments, the method further includes cleaning the body sub-assembly after welding the spill valve body to the inlet valve sleeve and prior to inserting the body sub-assembly into the bore in the fuel pump housing.

In specific embodiments, the fluid pump is a gasoline direct injection (GDi) pump.

In other embodiments, a method of assembling a spill valve of a high-pressure fluid pump includes providing a needle sub-assembly including a spill valve rod, a washer, and an armature; providing a spill valve body having a wall defining a cavity therein and an open end, the spill valve body including an integral sleeve portion at the open end, wherein a pole piece is disposed within the cavity; and providing an assembly tool having a fixture surface and a stepped portion adjacent the assembly surface. The method further includes inserting the spill valve rod into the assembly tool such that an increased diameter portion of the spill valve rod contacts the stepped portion of the assembly tool. The method further includes mating the washer with the spill valve rod and disposing the armature adjacent the washer such that the armature is disposed on an opposite side of the washer relative to the assembly tool. The method further includes disposing the spill valve body on the assembly tool such that the sleeve portion contacts the fixture surface of the assembly tool. After disposing the spill valve body on the assembly tool, the method further includes welding the spill valve body to the pole piece to form a body sub-assembly.

In specific embodiments, prior to inserting the spill valve rod into the assembly tool, the method further includes inserting a spring member through a bore in the armature of the needle sub-assembly and in urged engagement with the washer of the needle sub-assembly and the pole piece.

In specific embodiments, the method further includes providing a fuel pump housing having a bore formed in an outer surface of the fuel pump housing. Subsequent to welding the spill valve body to the inlet valve sleeve, the method further includes removing the body sub-assembly from the assembly tool and inserting the body sub-assembly into the bore in the fuel pump housing. The method also further includes welding the sleeve portion of the body sub-assembly to the fuel pump housing adjacent the bore. A stroke length of the needle sub-assembly is set by the stepped portion of the assembly tool.

In particular embodiments, the needle sub-assembly remains within the body sub-assembly when the body sub-assembly is removed from the assembly tool and inserted into the bore in the fuel pump housing.

In yet other embodiments, a method of assembling a spill valve of a high-pressure fluid pump includes providing an assembly tool having a fixture surface and a stepped portion adjacent the fixture surface, and an inlet valve sleeve. The method further includes disposing the inlet valve sleeve on the assembly tool such that the inlet valve sleeve contacts the fixture surface of the assembly tool. The method further includes providing a spill valve rod, a washer, and an armature that together constitute a needle sub-assembly. The method further includes inserting the spill valve rod into the assembly tool such that an increased diameter portion of the spill valve rod contacts the stepped portion of the assembly tool. The method further includes disposing the washer onto an end of the spill valve rod opposite the assembly tool. The method further includes disposing the armature adjacent the washer on a side of the washer opposite a side from which the spill valve rod is inserted. The method further includes providing a spill valve body having a wall defining a cavity therein and an open end, wherein a pole piece is disposed within the cavity through the open end. The method further includes inserting the open end of the spill valve body with the pole piece therein into the inlet valve sleeve. The method further includes welding the spill valve body to the inlet valve sleeve to form a body sub-assembly. A stroke length of the needle sub-assembly is set by the stepped portion of the assembly tool.

In specific embodiments, the method further includes providing a fuel pump housing having a bore formed in an outer surface of the fuel pump housing, the bore being in fluid communication with a pumping chamber defined within the fuel pump housing. Subsequent to welding the spill valve body to the inlet valve sleeve, the method further includes removing the body sub-assembly from the assembly tool and inserting the body sub-assembly into the bore in the fuel pump housing while maintaining needle sub-assembly within the cavity of the spill valve body. The method also further includes welding the inlet valve sleeve of the body sub-assembly to the fuel pump housing adjacent the bore.

In specific embodiments, a height of the stepped portion of the assembly tool relative to the fixture surface defines a stroke length of the needle sub-assembly.

In specific embodiments, the method further includes cleaning the body sub-assembly after welding the spill valve body to the inlet valve sleeve and prior to inserting the body sub-assembly into the bore in the fuel pump housing.

DESCRIPTION OF THE DRAWINGS

Various advantages and aspects of this disclosure may be understood in view of the following detailed description when considered in connection with the accompanying drawings, wherein.

DETAILED DESCRIPTION OF THE INVENTION

Referring in general to FIGS. 1-7, wherein like numerals indicate corresponding parts throughout the several views, a spill valve assembly for a fuel pump is illustrated and generally designated as spill valve 40. In exemplary embodiments, the spill valve 40 is applied to a gasoline direct injection (GDi) fuel pump 20. While the fuel pump is illustrated as a GDi pump, it should be understood that the invention is not limited to GDi pump applications, but could also be applied to other fuel/fluid pumps. An improved method of assembling the spill valve is provided herein.

Figure 1:
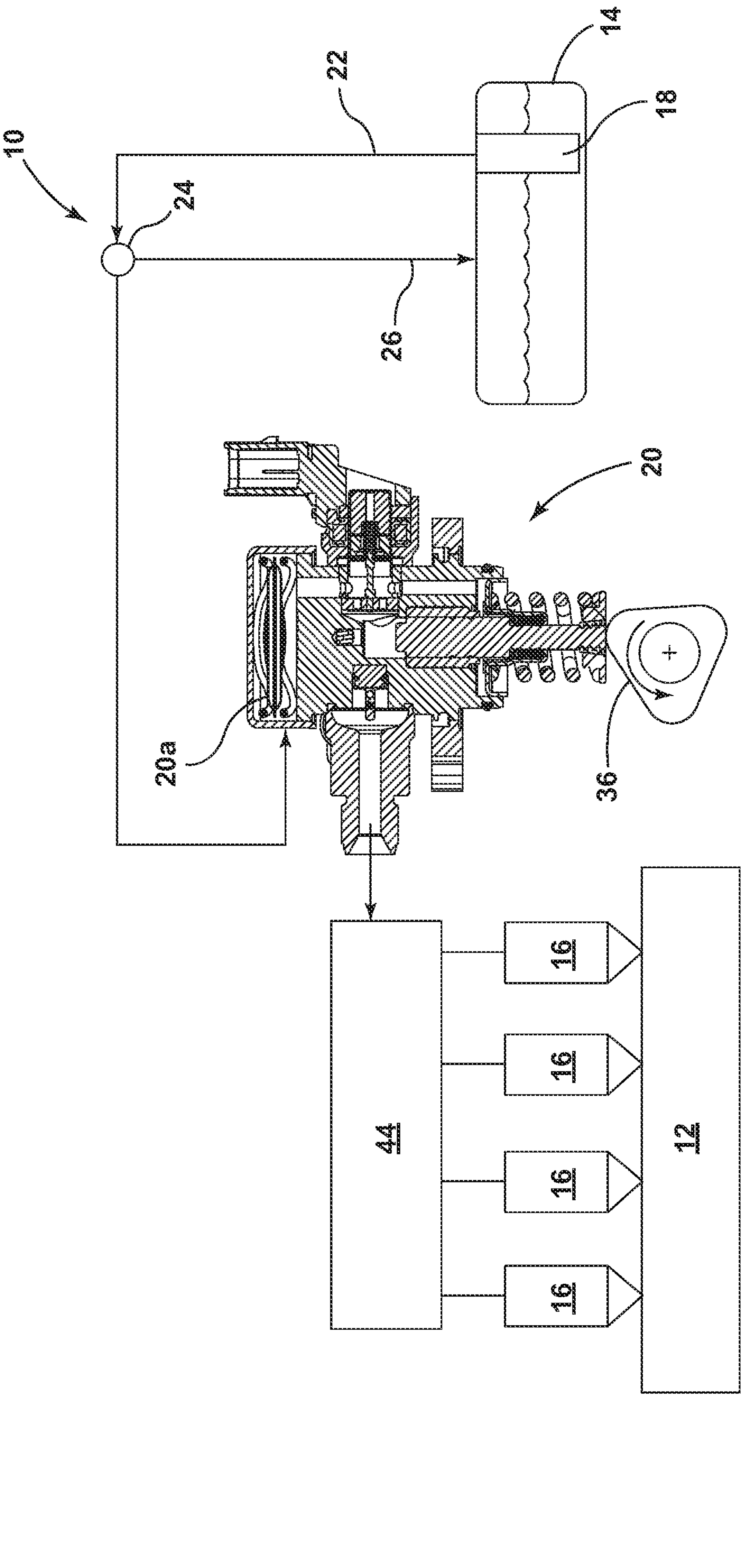
FIG. 1 is a schematic view of a fuel system including a high-pressure fuel pump having a spill valve assembled in accordance with embodiments of the disclosure.

In an exemplary embodiment of the disclosure and referring initially to FIG. 1, a fuel system 10 for an internal combustion engine 12 is shown in schematic form. Fuel system 10 generally includes a fuel tank 14 which holds a volume of fuel to be supplied to internal combustion engine 12 for operation thereof; a plurality of fuel injectors 16 which inject fuel directly into respective combustion chambers (not shown) of internal combustion engine 12; a low-pressure fuel pump 18; and a high-pressure fuel pump 20 where the low-pressure fuel pump 18 draws fuel from fuel tank 14 and elevates the pressure of the fuel for delivery to the high-pressure fuel pump 20 where the high-pressure fuel pump 20 further elevates the pressure of the fuel for delivery to the fuel injectors 16. By way of non-limiting example only, the low-pressure fuel pump 18 may elevate the pressure of the fuel to about 500 kPa or less and the high-pressure fuel pump 20 may elevate the pressure of the fuel to above about 14 MPa and even above 35 MPa in some applications. While four fuel injectors 16 have been illustrated, it should be understood that a lesser or greater number of fuel injectors 16 may be provided, depending, for example, on the number of cylinders/combustion chambers included in the internal combustion engine.

As shown, the low-pressure fuel pump 18 may be provided within the fuel tank 14. However, the low-pressure fuel pump 18 may alternatively be provided outside of the fuel tank 14. The low-pressure fuel pump 18 may be an electric fuel pump as are well known to a practitioner of ordinary skill in the art. A low-pressure fuel supply passage 22 provides fluid communication from the low-pressure fuel pump 18 to the high-pressure fuel pump 20. A fuel pressure regulator 24 may be provided such that the fuel pressure regulator 24 maintains a substantially uniform pressure within the low-pressure fuel supply passage 22 by returning a portion of the fuel supplied by the low-pressure fuel pump 18 to the fuel tank 14 through a fuel return passage 26. While the fuel pressure regulator 24 has been illustrated in the low-pressure fuel supply passage 22 outside of the fuel tank 14, it should be understood that the fuel pressure regulator 24 may be located within the fuel tank 14 and may be integrated with the low-pressure fuel pump 18.

Figure 2:
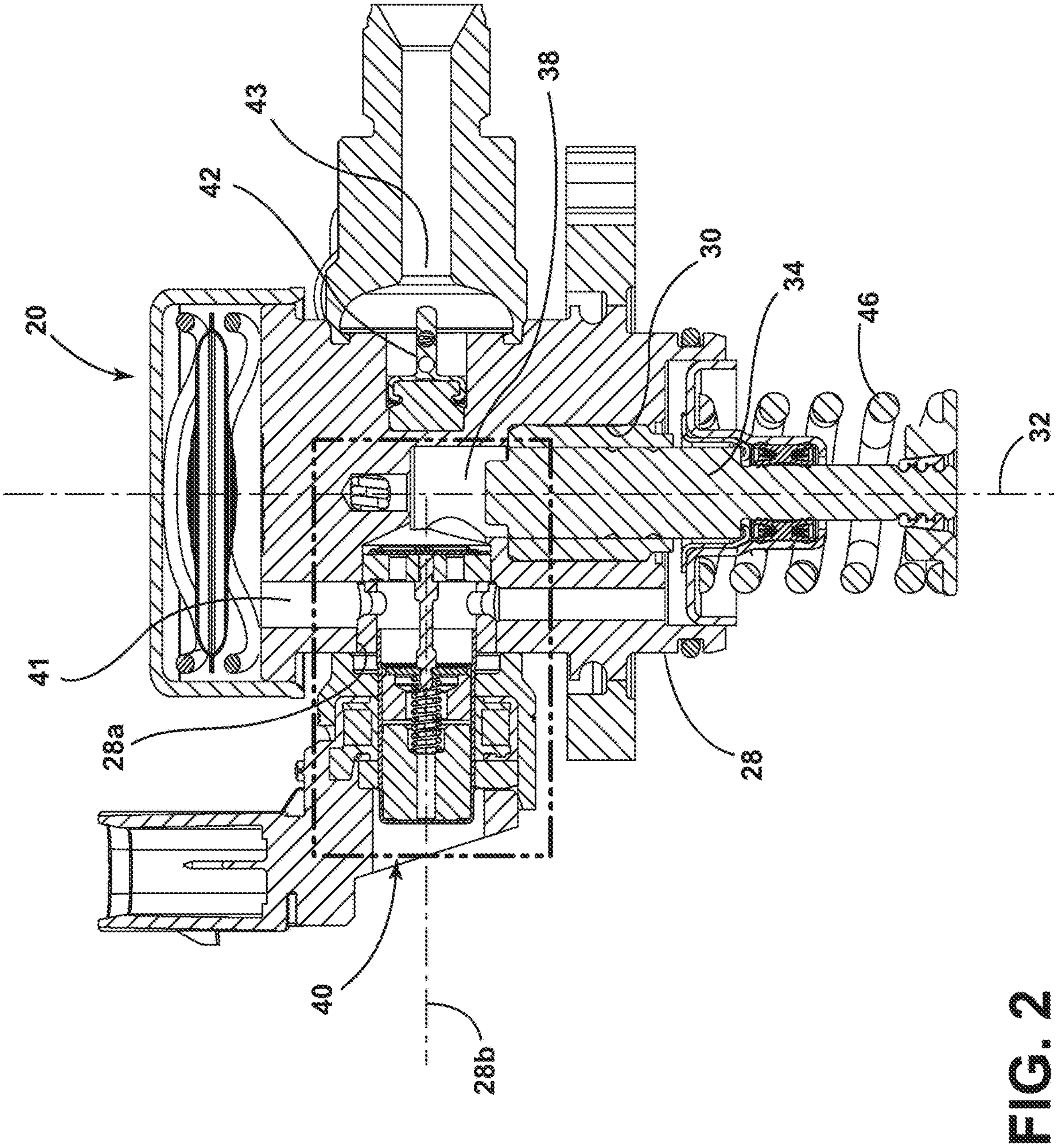
FIG. 2 is a cross-sectional view of the fuel pump of FIG. 1.

Now with additional reference to FIG. 2, the high-pressure fuel pump 20 includes a fuel pump housing 28 which includes a plunger bore 30 which extends along, and is centered about, a plunger bore axis 32. As shown, the plunger bore 30 may be defined by a combination of an insert and directly by the fuel pump housing 28. The high-pressure fuel pump 20 also includes a pumping plunger 34 which is located within the plunger bore 30 and reciprocates within the plunger bore 30 along the plunger bore axis 32 based on input from a rotating camshaft 36 of the internal combustion engine 12 (shown only in FIG. 1). A pumping chamber 38 is defined within the fuel pump housing 28, and more specifically, the pumping chamber 38 is defined by the plunger bore 30 and the pumping plunger 34. The spill valve 40 (which may be alternatively referred to as a control valve or generally as an inlet valve assembly) of the high-pressure fuel pump 20 is received within an inlet valve bore 28*a* of fuel pump housing 28 such that the inlet valve bore 28*a* extends to the exterior of the fuel pump housing 28, along an inlet valve bore axis 28*b* the high-pressure fuel pump 20 selectively provides and prevents fluid communication between an inlet 20*a* of the high-pressure fuel pump 20 and the pumping chamber 38 via a pump housing inlet passage 41 of the fuel pump housing 28 while an outlet valve assembly 42 is located within an outlet passage 43 of the fuel pump housing 28 and selectively allows fuel to be communicated from the pumping chamber 38 to the fuel injectors 16 via a fuel rail 44 to which each fuel injector 16 is in fluid communication. In operation, reciprocation of the pumping plunger 34 causes the volume of the pumping chamber 38 to increase during an intake stroke of the pumping plunger 34 (downward as oriented in FIG. 2) in which a plunger return spring 46 causes the pumping plunger 34 to move downward, and conversely, the volume of the pumping chamber 38 to decrease during a compression stroke (upward as oriented in FIG. 2) in which the camshaft 36 causes the pumping plunger 34 to move upward against the force of plunger return spring 46. In this way, fuel is selectively drawn into the pumping chamber 38 during the intake stroke, depending on operation of the spill valve 40 as will be described in greater detail later, and conversely, fuel is pressurized within the pumping chamber 38 by the pumping plunger 34 during the compression stroke and discharged through the outlet valve assembly 42 under pressure to the fuel rail 44 and fuel injectors 16.

Figure 3:
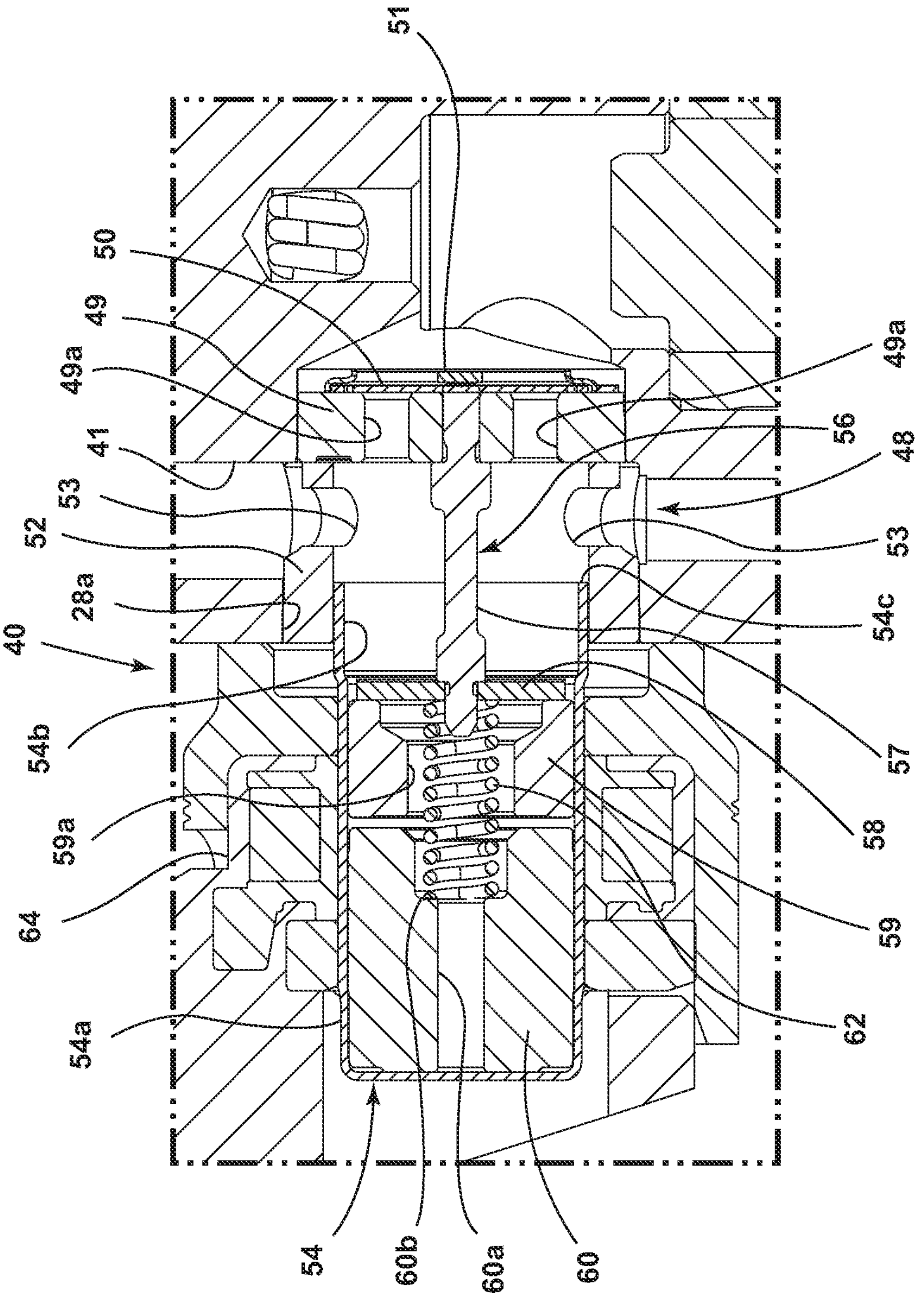
FIG. 3 is an enlargement of a portion of FIG. 2 showing the spill valve assembly.
Figure 4:
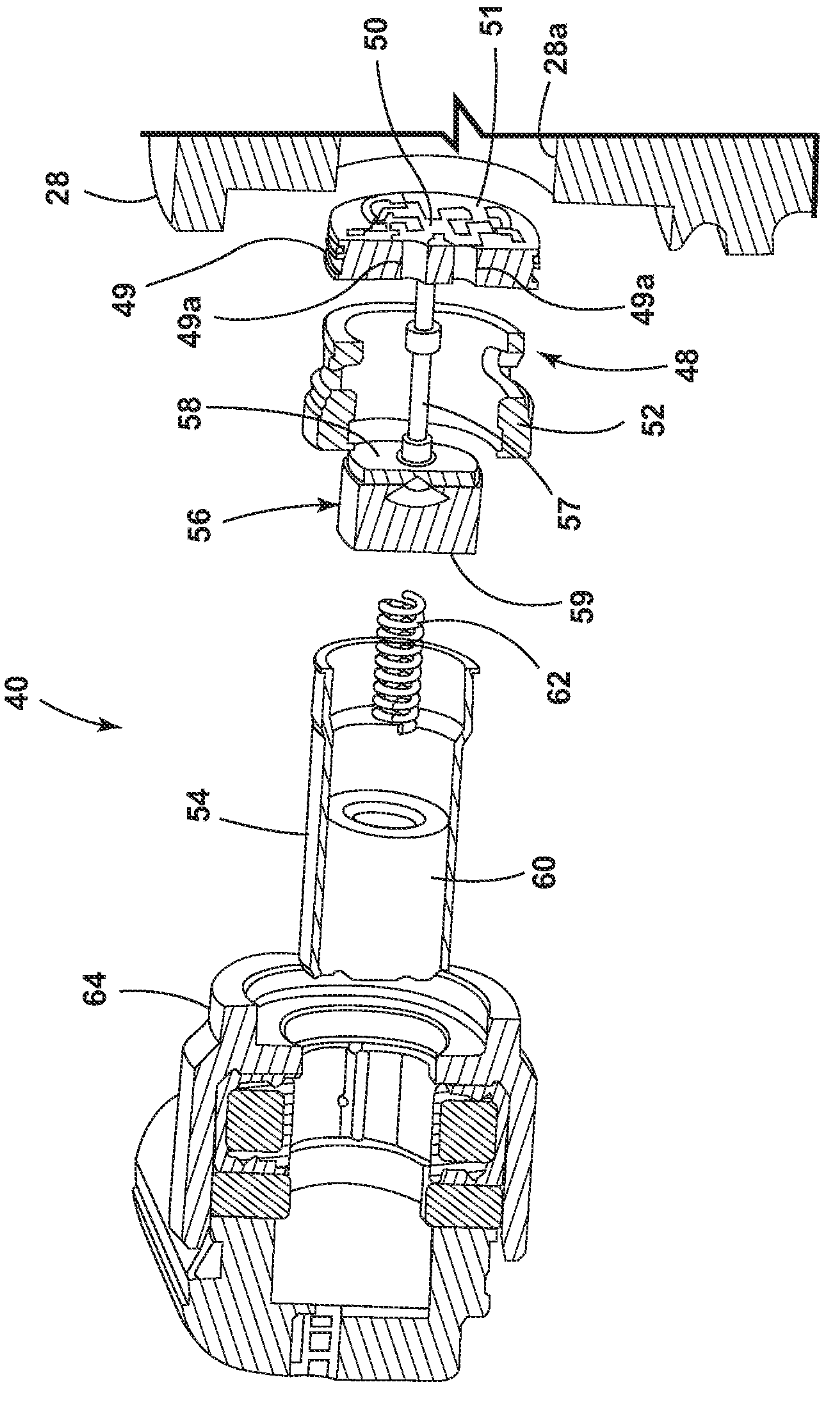
FIG. 4 is an exploded view of the spill valve assembly.

With particular reference now to FIGS. 3 and 4, the spill valve 40 includes an inlet valve sub-assembly 48 received within the inlet valve bore 28*a*. The inlet valve sub-assembly 48 includes an inlet valve disc 49, a shutter 50 capable of moving toward and away from the inlet valve disc 49, and a stop 51 that limits the movement of the shutter 50 away from the inlet valve disc 49. The inlet valve disc 49 includes a plurality of outlet passages 49*a*. In a closed disposition, the shutter 50 covers the outlet passages 49*a* and prevents fluid flow therethrough, and in an open disposition, the shutter 50 moves away from the inlet valve disc 49 and no longer blocks fluid flow through the outlet passages 49*a*. The spill valve 40 is thereby in fluid communication with the pumping chamber 38. An inlet valve sleeve 52 is also disposed within the inlet valve bore 28*a*, adjacent a side of the inlet valve disc 49. The inlet valve sleeve 52 is cylindrical and is centered about, and extends along, the inlet valve bore axis 28*b*. The inlet valve sleeve 52 is in fluid communication with the pump housing inlet passage 41 via valve sleeve passages 53.

A spill valve body 54 extends from the inlet valve sleeve 52. The spill valve body 54 is cylindrical and has an open end adjacent the inlet valve sleeve 52 and an opposite closed end. The spill valve body 54 is centered about and extends along the inlet valve bore axis 28*b*. In the embodiment shown, the spill valve body 54 is received within the inlet valve sleeve 52 such that the spill valve body 54 is sealed to the inlet valve sleeve 52 and hence the fuel pump housing 28 in order to prevent leakage of fuel from the pump housing inlet passage 41 to the exterior of the fuel pump housing 28. This sealing may be accomplished, by way of non-limiting example only, by one or more of interference fit between the spill valve body 54 and inlet valve sleeve 52, welding around the inner corner where the spill valve body 54 meets the inlet valve sleeve 52, and adhesives. In various embodiments disclosed herein, the spill valve body 54 is welded to the inlet valve sleeve 52. The spill valve body 54 has a wall 54*a* defining a cavity 54*b* therein. A spill valve needle sub-assembly 56 is located within the inlet valve sleeve 52 and the spill valve body 54. The spill valve needle sub-assembly 56 includes a spill valve rod 57, a washer 58, and an armature 59. One end of the spill valve rod 57 is inserted into a central opening in the inlet valve disc 49, and an opposite end of the spill valve rod 57 is inserted into a central opening in the washer 58. The armature 59 is adjacent a side of the washer 58 generally opposite the spill valve rod 57 such that the washer 58 is generally sandwiched between the spill valve rod 57 and the armature 59 and the spill valve rod 57 extends away from a side of the washer 58 opposite the armature 59. The armature 59 is made of magnetic material and is also centered about, and extends along, the inlet bore axis 28*b*. The armature 59 is generally cylindrical with a central through bore 59*a* extending therethrough. A pole piece 60 is disposed within the spill valve body 54 adjacent the closed end, and between the closed end and the armature 59. The pole piece 60 is made of a magnetically permeable material and is received within the spill valve body 56 such that the pole piece 60 is centered about, and extends along, the inlet valve bore axis 28*b*. A pole piece bore 60*a* extends axially through the pole piece 60 and includes a shoulder 60*b*. A spring member in the form of a return spring 62 is inserted through the through bore 59*a* in the armature 59 and extends between the washer 58 and the bore 60*a* in the pole piece 60. The return spring 62 is partially received in the pole piece bore 60*a* and abuts against the pole piece shoulder 60*b*. The return spring 62 is held in compression between the pole piece shoulder 60*b* and the washer 58, and in this way, the return spring 62 biases the armature 59 away from the pole piece 60.

A solenoid coil assembly 64 is disposed over and mated with the spill valve body 54. Activation of the coil assembly 64 actuates the spill valve 40. Particularly, when the coil assembly 64 is activated by an electric current signal, the armature 59, which is slidable within the spill valve body 54, is drawn towards the pole piece 60. Movement of the armature 59 (to the left in FIG. 3) pulls the spill valve rod 57 in a direction away from the inlet valve disc 49, causing the shutter 50 to close the outlet passages 49*a*. In this configuration, fuel drawn into the pumping chamber 38 is pressurized and forced out the outlet passage 43; thus the high-pressure fuel pump 20 pumps fuel. Otherwise, when no electric signal is sent to the coil assembly 64 (the coil assembly is deactivated), the return spring 62 forces the spill valve rod 57 away from the pole piece 60 and back in a direction towards the inlet valve disc 49 (to the right in FIG. 3) which forces the shutter 50 away from the inlet valve disc 49 to open the outlet passages 49*a*. In this configuration, fuel in the pumping chamber 38 is pushed through the outlet passages 49*a* to spill through the valve sleeve outlet passages 53 and out of the pump housing 28. Thus, in this configuration no fuel is pumped by the high-pressure fuel pump 20.

Figure 5:
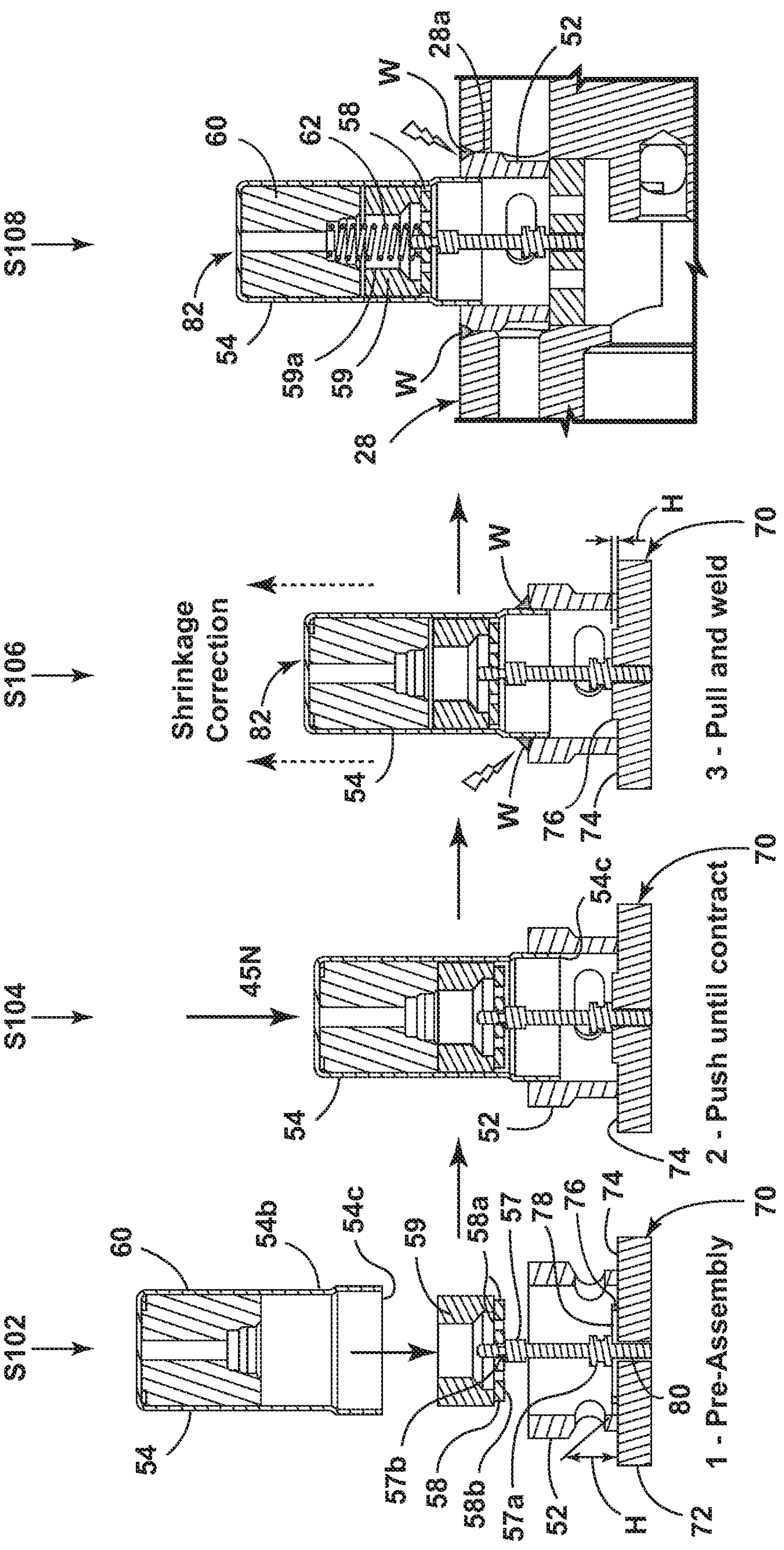
FIG. 5 is a schematic view of a method of assembling the spill valve assembly of the high-pressure fuel pump in accordance with some embodiments of the disclosure.

Turning to FIG. 5, in some embodiments, to assemble the spill valve 40, the inlet valve sleeve 52 is placed onto an assembly tool 70. The assembly tool 70 generally includes a base 72 having a fixture surface 74 and a raised, stepped portion 76 adjacent and on top of the fixture surface 74. The stepped portion 76 has a raised surface 78. The assembly tool 70 is shown schematically and in cross-section, and it should be understood that the assembly tool may have other aesthetic appearances while including the same structure and function of the fixture surface and stepped portion. At step S102, the inlet valve sleeve 52 is placed on the assembly tool 70 in a disposition such that an end of the inlet valve sleeve 52 contacts and rests on the fixture surface 74, and the tubular body of the inlet valve sleeve 52 extends vertically from the fixture surface 74. In this disposition, a central, longitudinal axis of the inlet valve sleeve 52 is generally perpendicular to the fixture surface 74 and passes through the center of the stepped portion 76. Next, a needle sub-assembly constituted by the spill valve rod 57, the washer 58, and the armature 59 is assembled on the assembly tool 70. More particularly, an end of the elongated spill valve rod 57 is inserted into an opening 80 in the assembly tool 70 such that an increased diameter portion 57*a* of the spill valve rod 57 contacts the stepped portion 76 of the assembly tool 70. The opening 80 extends through the stepped portion 76 and may be generally disposed in the center of the stepped portion. Then the washer 58 is placed onto an end 57*b* of the spill valve rod 57 that is opposite from the assembly tool 70. Next, the armature 59 is placed onto the washer 58 on a side 58*a* of the washer opposite the side 58*b* from which the spill valve rod 57 is inserted.

Subsequent to assembling the needle sub-assembly, the pole piece 60 is inserted into the cavity 54*b* of the spill valve body 54 through the open end 54*c*. With the pole piece 60 located in the spill valve body 54, the open end 54*c* of the spill valve body 54 is inserted into the inlet valve sleeve 52 at an end that is distal from the end that contacts the fixture surface 74 of the assembly tool 70. At step S104, the spill valve body 54 is pushed into the inlet valve sleeve 52 with a certain degree of force (for example, on the order of tens of N) until the spill valve body 54 has made sufficient contact with the inlet valve sleeve 52. Next, at step S106, the spill valve body 54 may be pulled slightly in a direction away from the inlet valve sleeve 52 and assembly tool 70 to correct for any shrinkage that may have occurred from the previous pushing step, and then at step S106 the spill valve body 54 is welded to the inlet valve sleeve 52 from the outside to form a body sub-assembly 82. A height H of the stepped portion 76 relative to the fixture surface 74 of the assembly tool 70 defines a stroke length of the needle sub-assembly and as such, the stroke length of the needle sub-assembly is set by the stepped portion 76 of the assembly tool 70. Thus, the stroke length is tied to the specific needle sub-assembly structure inserted into the assembly tool 70 and included within the inlet valve sleeve 52 and spill valve body 54 of the body sub-assembly. Therefore, the needle sub-assembly must be kept with the same body sub-assembly 82 throughout the process, which includes the following steps in which the body sub-assembly 82 is welded into the pump housing 28. Once the inlet valve sleeve 52 is welded to the spill valve body 54, the body sub-assembly 82 may be removed from the assembly tool 70.

The return spring 62 must be placed through the bore 59*a* in the armature 59 and placed in urged engagement with the washer 58 and the pole piece 60. This may be accomplished before or as the spill valve body 54 is inserted into the inlet valve sleeve 52. Alternatively, this may be accomplished after the spill valve body 52 is welded to the inlet valve sleeve 52.

After the body sub-assembly 82 is removed from the assembly tool 70, the body sub-assembly 82 may be washed to clean away any welding spatter or other debris or residue that was generated during the welding process. Subsequently, at step S108, the body sub-assembly 82 is inserted into the inlet valve bore 28*a* in the fuel pump housing 28 while maintaining the needle sub-assembly within the spill valve body 54 as described above. Then, the inlet valve sleeve 52 is welded to the fuel pump housing 28 at a location W that is adjacent the periphery of the inlet valve bore 28*a*, particularly the interface between the inlet valve sleeve 52 and the inlet valve bore 28*a*. Since this weld does not contact the spill valve body 54 and does not penetrate through the spill valve body, and since the spill valve body is welded to the inlet valve sleeve 52 prior to the inlet valve sleeve being inserted into the pump housing 28, no blowoff or welding spatter is generated that can become trapped within the spill valve body.

Figure 6:
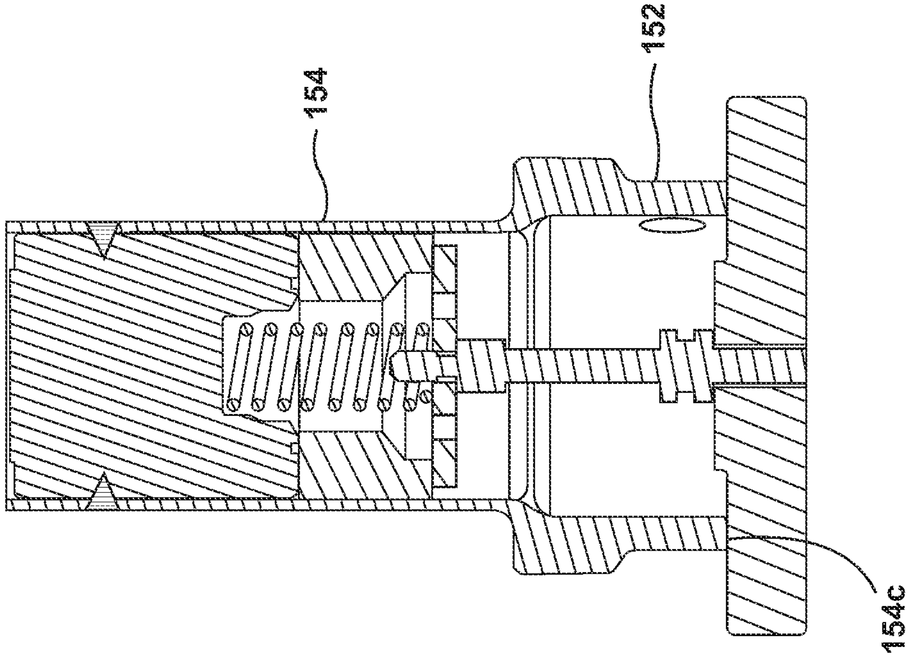
FIG. 6 is a schematic view of a method of assembling the spill valve assembly in accordance with other embodiments of the disclosure.

With reference to FIG. 6, in other embodiments the inlet valve sleeve 152 is integral with the spill valve body 154 such that the inlet valve sleeve 152 forms a sleeve portion at the open end 154*c* of the spill valve body 154. Thus, the spill valve body and inlet valve sleeve are formed as a single-piece construction. For example, the spill valve body 154 may be machined to include an integral inlet valve sleeve. The integration of the inlet valve sleeve with the spill valve body eliminates the step of welding the spill valve body to the inlet valve sleeve, and thus avoids the possibility of welding spatter being formed by welding together the inlet valve sleeve and the spill valve body. Otherwise, the method of assembling a spill valve with the spill valve body 154 having an integral inlet valve sleeve 152 is the same as, and includes the same steps as, the first embodiments above using a separate spill valve body 54 and inlet valve sleeve 52.

Figure 7:
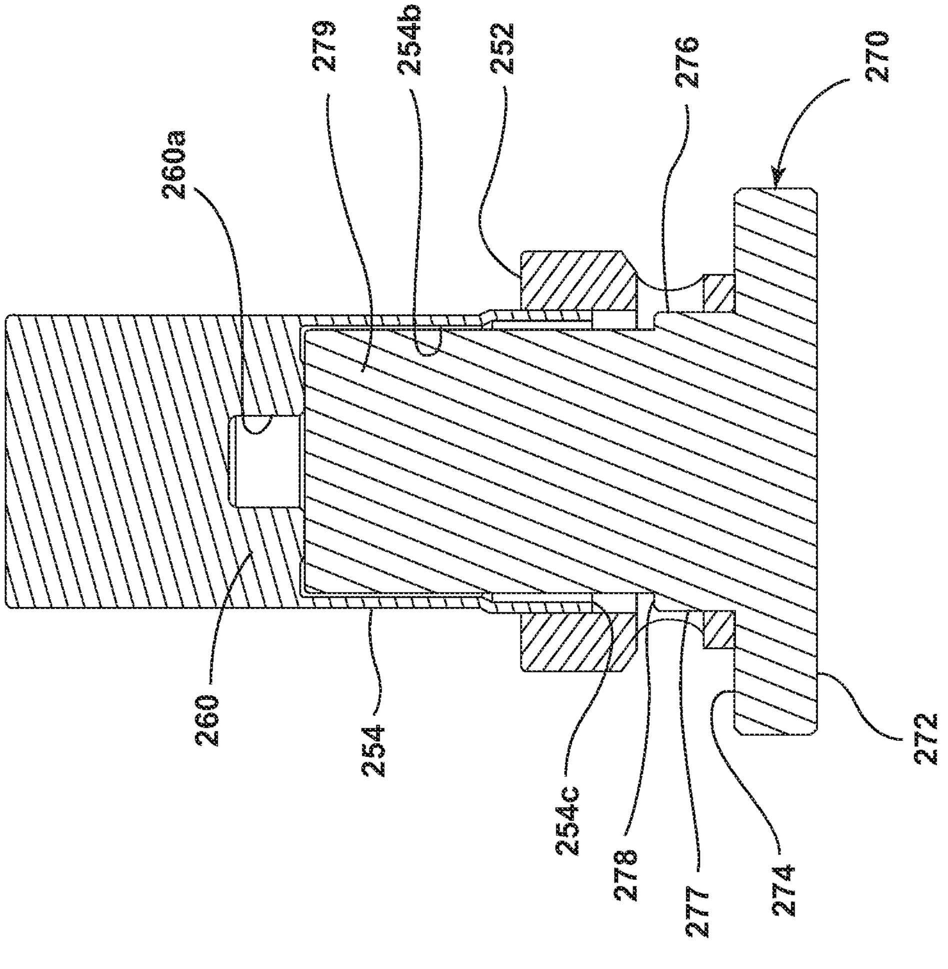
FIG. 7 is a schematic view of a method of assembling the spill valve assembly in accordance with yet other embodiments of the disclosure.

With reference to FIG. 7, in yet other embodiments the pole piece 260 is integral with the spill valve body 254. Thus, the spill valve body and the pole piece are formed as a single-piece construction. For example, the spill valve body may be machined to include an integral pole piece. The thin wall of the integral spill valve body prevents short circuiting the magnetic path and maintains its function. The integration of the pole piece with the spill valve body eliminates one separate part (the pole piece) from the set of parts used to construct the spill valve. Further, the spill valve body and pole piece are independent from the needle sub-assembly, such that the spill valve body and pole piece are not married to a specific needle sub-assembly. Thus, the integral spill valve body and pole piece as well as the connected inlet valve sleeve can be interchanged and replaced with another integral spill valve body and/or inlet valve sleeve without scraping the rest of the spill valve assembly.

With continued reference to FIG. 7, in these embodiments the assembly tool 270 has a base 272, a tool fixture surface 274, and a stepped portion 276 defining a raised surface 278. The assembly tool 270 further includes an elongated protrusion 279 extending from the raised surface 278 of the stepped portion 276 in a direction generally perpendicular to the base 272. To assemble a spill valve using the assembly tool 270, first an inlet valve sleeve 252 is set on the assembly tool 270 in a disposition such that an end of the inlet valve sleeve 252 contacts and rests on the fixture surface 274, and the tubular body of the inlet valve sleeve 252 extends vertically from the fixture surface 274. In this disposition, a central, longitudinal axis of the inlet valve sleeve 252 is generally perpendicular to the fixture surface 274 and passes through the center of the elongated protrusion 279. Also, the tubular body of the inlet valve sleeve 252 at the end adjacent the fixture surface 274 contacts the sidewall 277 of the stepped portion 276. Next, the spill valve body 254 with integral pole piece 260 is inserted onto the assembly tool 270 and into the inlet valve sleeve 252. Particularly, the spill valve body 254 is placed on the assembly tool 270 such that the elongated protrusion 279 extends into the open end 254*c* of the spill valve body 254 and the terminal end of the elongated protrusion 279 contacts the pole piece 260. Further, the open end 254*c* of the spill valve body 254 is inserted into the inlet valve sleeve 252 at an end of the inlet valve sleeve that is distal from the end that contacts the fixture surface 274 of the assembly tool 270, such that the spill valve body is sandwiched between the side of the elongated protrusion 279 and the tubular body of the inlet valve sleeve 252. Subsequently, the spill valve body 254 is welded to the inlet valve sleeve 252 from the outside to join the spill valve body 254 to the inlet valve sleeve 252 as a body sub-assembly. After welding, the body sub-assembly is then removed from the assembly tool 270 and may be washed to clean away any welding spatter or other debris or residue that was generated during the welding process.

Next, a return spring is inserted into the bore 260*a* of the pole piece 260, and a needle sub-assembly including a spill valve rod, a washer, and an armature is inserted into the cavity 254*b* of the spill valve body 254 such that the washer is generally sandwiched between the spill valve rod and the armature, the spill valve rod extends away from a side of the washer opposite the armature, and the return spring extends through the through bore of the armature and contacts the washer. The body sub-assembly and associated needle sub-assembly is then inserted into the inlet valve bore in the fuel pump housing, and the inlet valve sleeve is welded to the fuel pump housing at a location that is adjacent the periphery of the inlet valve bore, particularly the interface between the inlet valve sleeve and the inlet valve bore, similar to the welding step shown in FIG. 5.

In yet other further embodiments, the embodiments described above may be combined together in various combinations. For example, the spill valve body may be integrally formed with both the inlet valve sleeve and the pole piece, and the stroke length of the needle sub-assembly may be set using a tool assembly 70 including a stepped portion 76 having a height H.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range “of from 0.1 to 0.9” may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements by ordinal terms, for example "first," "second," and "third," are used for clarity, and are not to be construed as limiting the order in which the claim elements appear. Any reference to claim elements in the singular, for example, using the articles "a," "an," "the" or "said," is not to be construed as limiting the element to the singular.

What is claimed is:

1. A method of assembling a spill valve of a high-pressure fluid pump, the method comprising:

providing an inlet valve sleeve;

providing an assembly tool having a fixture surface and a stepped portion adjacent the fixture surface;

disposing the inlet valve sleeve on the assembly tool such that the inlet valve sleeve contacts the fixture surface of the assembly tool;

providing a spill valve body having a wall defining a cavity therein and an open end, wherein a pole piece is disposed within the cavity;

inserting the open end of the spill valve body with the pole piece therein into the inlet valve sleeve;

welding the spill valve body to the inlet valve sleeve to form a body sub-assembly;

providing a fuel pump housing having a bore formed in an outer surface of the fuel pump housing;

subsequent to welding the spill valve body to the inlet valve sleeve, removing the body sub-assembly from the assembly tool and inserting the body sub-assembly into the bore in the fuel pump housing; and welding the inlet valve sleeve of the body sub-assembly to the fuel pump housing adjacent the bore.

2. The method of claim 1, wherein prior to the step of inserting the spill valve body into the inlet valve sleeve, further including the steps of:

providing a needle sub-assembly including a spill valve rod, a washer, and an armature, wherein the washer is generally sandwiched between the spill valve rod and the armature such that the spill valve rod extends away from a side of the washer opposite the armature; and inserting the spill valve rod of the needle sub-assembly through the inlet valve sleeve such that an increased diameter portion of the spill valve rod contacts the stepped portion of the assembly tool.

3. The method of claim 2, wherein a spring member is placed through a bore in the armature of the needle sub-assembly and in urged engagement with the washer of the needle sub-assembly and the pole piece.

4. The method of claim 2, wherein a height of the stepped portion of the assembly tool relative to the assembly surface defines a stroke length of the needle sub-assembly.

5. The method of claim 1, wherein the stepped portion of the assembly tool includes an elongated protrusion.

6. The method of claim 5, wherein the step of inserting the open end of the spill valve body with the pole piece therein into the inlet valve sleeve further includes contacting the pole piece with the elongated protrusion of the assembly tool.

7. The method of claim 5, wherein the inlet valve sleeve contacts a sidewall of the stepped portion of the assembly tool.

8. The method of claim 5, wherein the pole piece is integral with the spill valve body.

9. The method of claim 8, wherein after removing the body sub-assembly from the assembly tool and prior to inserting the body sub-assembly into the bore in the fuel pump housing, further including the steps of:

providing a needle sub-assembly including a spill valve rod, a washer, and an armature, wherein the washer is generally sandwiched between the spill valve rod and the armature such that the spill valve rod extends away from a side of the washer opposite the armature;

inserting a spring member through a bore in the armature; and inserting the spring member and needle sub-assembly into the cavity of the spill valve body and adjacent pole piece such that the spring member is disposed between the washer and the pole piece.

10. The method of claim 1, further including the step of cleaning the body sub-assembly after welding the spill valve body to the inlet valve sleeve and prior to inserting the body sub-assembly into the bore in the fuel pump housing.

11. The method of claim 1, wherein the fluid pump is a gasoline direct injection (GDi) pump.

12. A method of assembling a spill valve of a high-pressure fluid pump, the method comprising:

providing an assembly tool having a fixture surface and a stepped portion adjacent the fixture surface;

providing an inlet valve sleeve;

disposing the inlet valve sleeve on the assembly tool such that the inlet valve sleeve contacts the fixture surface of the assembly tool;

providing a spill valve rod, a washer, and an armature that together constitute a needle sub-assembly;

inserting the spill valve rod into the assembly tool such that an increased diameter portion of the spill valve rod contacts the stepped portion of the assembly tool;

disposing the washer onto an end of the spill valve rod opposite the assembly tool;

disposing the armature adjacent the washer on a side of the washer opposite a side from which the spill valve rod is inserted;

providing a spill valve body having a wall defining a cavity therein and an open end, wherein a pole piece is disposed within the cavity through the open end;

inserting the open end of the spill valve body with the pole piece therein into the inlet valve sleeve; and welding the spill valve body to the inlet valve sleeve to form a body sub-assembly;

wherein a stroke length of the needle sub-assembly is set by the stepped portion of the assembly tool.

13. The method of claim 12, further including the steps of:

providing a fuel pump housing having a bore formed in an outer surface of the fuel pump housing, the bore being in fluid communication with a pumping chamber defined within the fuel pump housing;

subsequent to welding the spill valve body to the inlet valve sleeve, removing the body sub-assembly from the assembly tool and inserting the body sub-assembly into the bore in the fuel pump housing while maintaining needle sub-assembly within the cavity of the spill valve body; and welding the inlet valve sleeve of the body sub-assembly to the fuel pump housing adjacent the bore.

14. The method of claim 12, wherein a height of the stepped portion of the assembly tool relative to the fixture surface defines a stroke length of the needle sub-assembly.

15. The method of claim 12, further including the step of cleaning the body sub-assembly after welding the spill valve body to the inlet valve sleeve and prior to inserting the body sub-assembly into the bore in the fuel pump housing.

* * * * *